(12) United States Patent
Ellis

(10) Patent No.: US 6,925,224 B2
(45) Date of Patent: Aug. 2, 2005

(54) POLYSILICON OPTICAL ROUTER HAVING ROTOR

(75) Inventor: John Nigel Ellis, Tavistock (GB)

(73) Assignee: Zarlink Semiconductor Limited (GB)

( * ) Notice: Subject to any disclaimer, the term of this patent is extended or adjusted under 35 U.S.C. 154(b) by 413 days.

(21) Appl. No.: 10/079,680

(22) Filed: Feb. 20, 2002

(65) Prior Publication Data

US 2003/0156785 A1 Aug. 21, 2003

(51) Int. Cl.[7] ............................ G02B 6/26; G02B 6/35; H02K 7/06
(52) U.S. Cl. ............................ 385/22; 385/16; 385/25; 385/26; 310/40 MM
(58) Field of Search ..................... 385/16, 18, 20–26, 385/129–132; 310/40 MM

(56) References Cited

U.S. PATENT DOCUMENTS

| | | | |
|---|---|---|---|
| 5,252,881 A | * 10/1993 | Muller et al. | 310/40 MM |
| 5,278,692 A | 1/1994 | Delapierre | |
| 6,028,552 A | 2/2000 | Shuguang | |
| 6,360,424 B1 | * 3/2002 | Mehregany et al. | 310/40 MM |
| 6,404,943 B1 | * 6/2002 | Wang | 385/22 |

FOREIGN PATENT DOCUMENTS

| JP | 62112116 | 5/1987 |
|---|---|---|
| JP | 05241084 | 9/1993 |

OTHER PUBLICATIONS

Yassen, A.A. et al., "A Rotary Electrostatic Micromotor 1×8 Optical Switch," *IEEE Journal of Selected Topics in Quantum Electronics*, vol. 5, No. 1, Jan./Feb. 1999.

Krygowski, T.W. et al., "A Low–Voltage Rotary Actuator Fabricated Using a Five–Level Polysilicon Surface Micromachining Technology," *IEEE* (1999).

* cited by examiner

*Primary Examiner*—Rodney Bovernick
*Assistant Examiner*—Omar Rojas
(74) *Attorney, Agent, or Firm*—Thompson Hine LLP

(57) ABSTRACT

An optical router comprises a substantially planar substrate, a stator fixed to and projecting from an upper surface of the substrate, and a rotor surrounding the stator so as to be rotatable about the stator. At least one optical guiding component is formed in or on the rotor. A substantially planar layer is provided on the substrate surrounding the rotor and has a plurality of optical waveguides formed therein, the waveguides opening at least one end onto a space surrounding the rotor. The stator rotor, and planar layer are formed on the substrate by a series of deposition and etching steps such that the rotor may be rotated about the stator so as to align the optical guiding component with one or more of the waveguide openings.

7 Claims, 6 Drawing Sheets

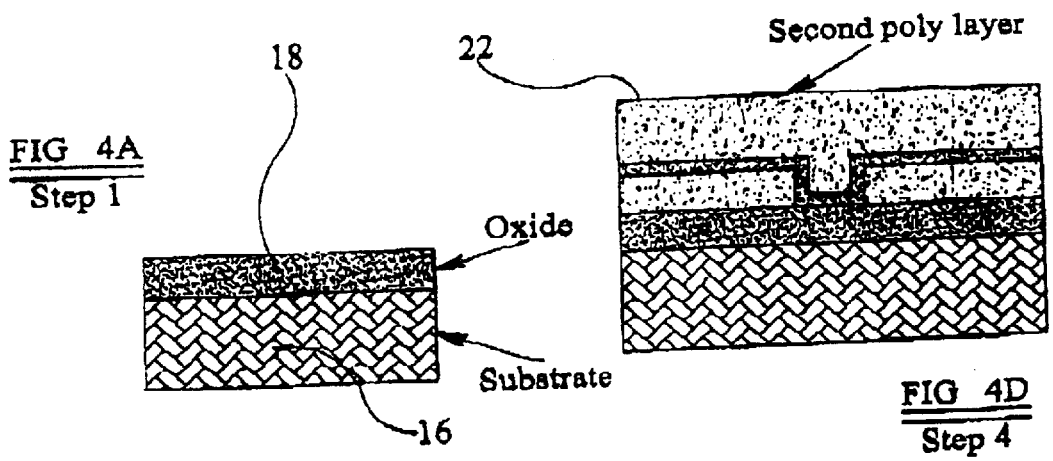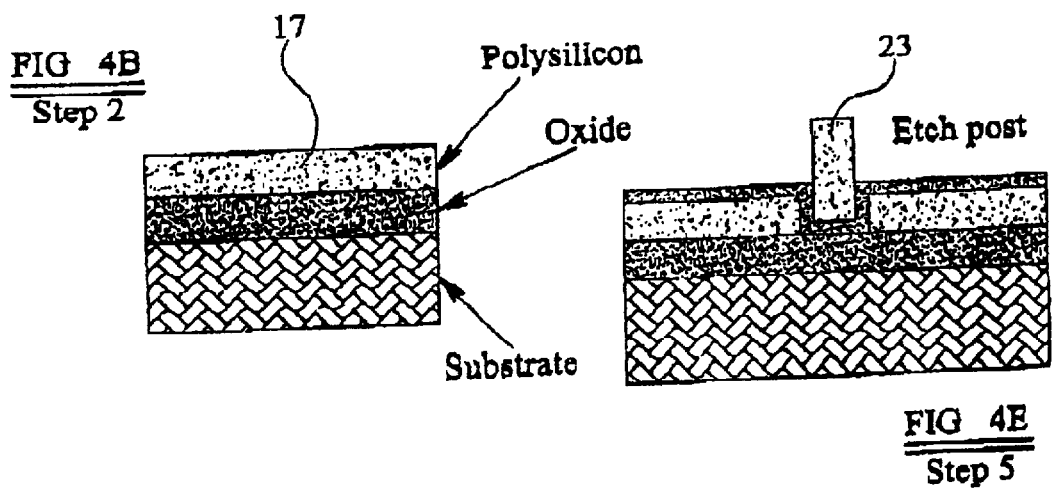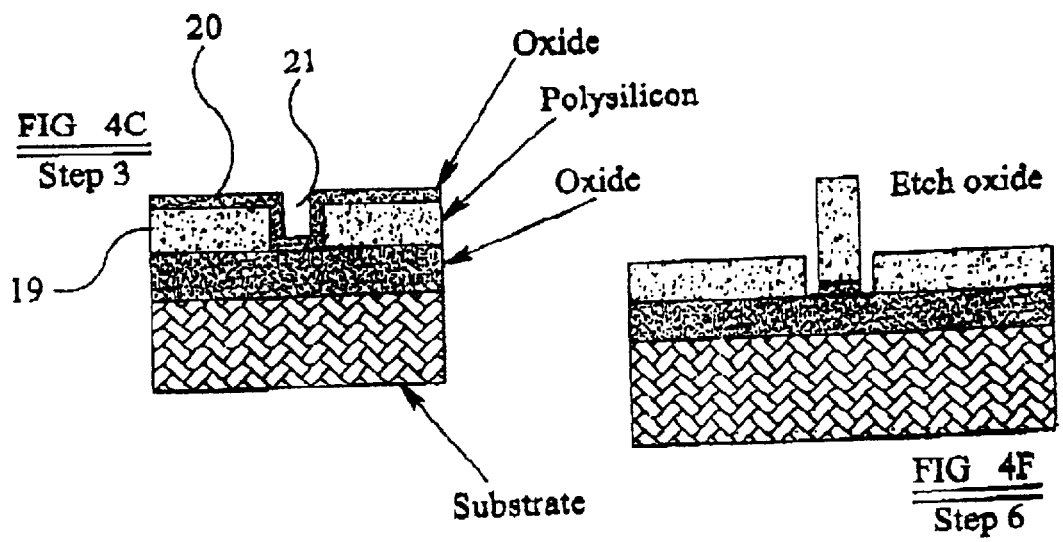

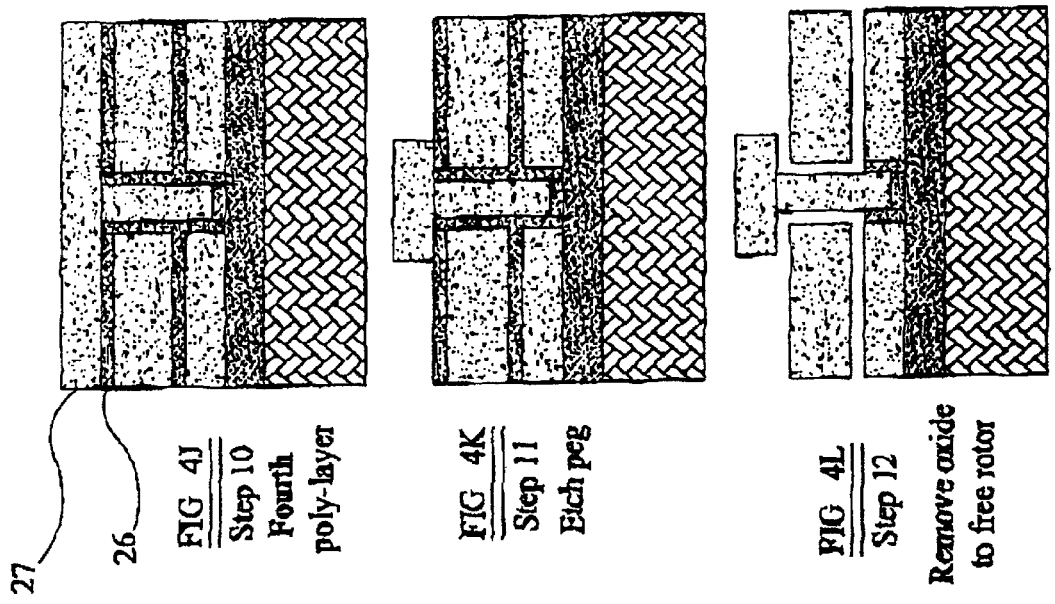
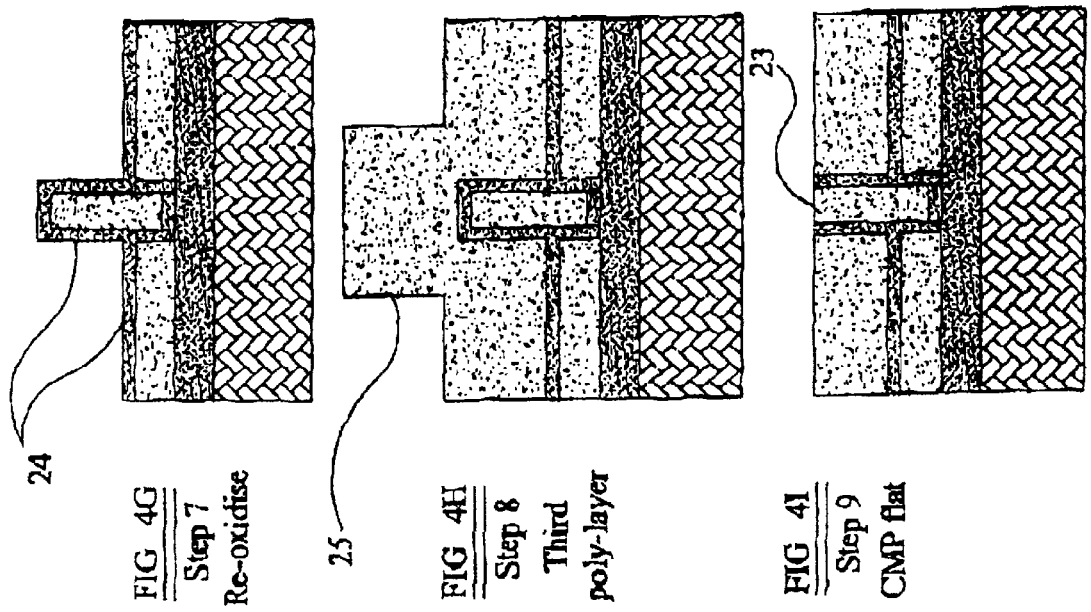

POLYSILICON OPTICAL ROUTER HAVING ROTOR

FIELD OF THE INVENTION

The present invention relates to optical routers and in particular to integrated optical routers.

With the increasing use of optical fibres for carrying information, there is a growing demand for efficient optical routers (or switches) for routing signals between optical fibres and/or other types of light guides.

BACKGROUND

Traditionally, large mechanical type routers have been used, disposed between one or more input fibres and one or more output fibres. The routers may be actuated by electrical motors or solenoids. Such routers are both bulky and expensive, and alternative integrated optical routers have been proposed.

One integrated approach involves fabricating waveguides in a planar substrate, each waveguide being coupled to a corresponding optical fibre. Disposed in the waveguides are phase shifting components which are electrically actuable to change the optical properties of the waveguide material. This may block the transmission of light through a waveguide and or may cause the light to be coupled to an adjacent waveguide. Such a router is described in U.S. Pat. No. 6,028,552.

Another approach to providing an integrated optical router is to provide a linearly movable switching "plate" in a planar substrate between input and output waveguides formed in the substrate. The plate is moveable as a result of electrostatic force. In a first position, a waveguide formed in the plate may couple corresponding input and out waveguides on the substrate, whilst in a second position the waveguide in the plate is misaligned with the input and output waveguides such that they are not coupled together. Such devices operate generally as on off switches, i.e. their capacity to route signals (i.e. from a single input to one of several outputs) is limited.

SUMMARY OF THE INVENTION

It is an object of the present invention to overcome or at least mitigate the disadvantages of known optical routers. This and other objects are achieved by using micro machining to form a rotatable switching component in a planar substrate, between input and output light waveguides.

According to a first aspect of the present invention there is provided an optical router comprising:

a substantially planar substrate;

a stator fixed to and projecting from an upper surface of the substrate;

a rotor surrounding the stator so as to be rotatable about the stator;

at least one optical guiding component formed in or on the rotor;

a substantially planar layer on the substrate surrounding the rotor and having a plurality of optical waveguides formed therein, the waveguides opening at least one end onto a space surrounding the rotor; and the stator, rotor, and planar layer having been formed on the substrate by a series of deposition and etching steps, wherein the rotor may be rotated about the stator so as to align said optical guiding component with one or more of said waveguide openings.

The optical guiding component formed in or on the rotor may be a waveguide extending across the rotor in a substantially transverse plane. Alternatively, the component may be a mirror arranged to reflect radiation exiting from one of said waveguide openings.

According to a second aspect of the present invention there is provided an optical router comprising:

a substantially planar substrate;

a stator fixed to and projecting from an upper surface of the substrate;

a rotor surrounding the stator so as to be rotatable about the stator;

at least one optical waveguide extending across the rotor in a substantially transverse plane, the ends of the waveguide opening onto the periphery of the rotor; and a substantially planar layer on the substrate surrounding the rotor and having a plurality of optical waveguides formed therein, the waveguides opening at least one end onto a space surrounding the rotor; and the stator, rotor, and planar layer having been formed on the substrate by a series of deposition and etching steps, wherein the openings of the waveguide on the rotor may be aligned with openings of the waveguides on the planar layer by rotation of the rotor about the stator.

According to a third aspect of the present invention there is provided a method of fabricating an optical router, the method comprising the steps of:

forming a stator on a planar substrate;

depositing a dielectric layer on the substrate surrounding the stator;

etching the dielectric layer to form a rotor surrounding the stator and a planar layer surrounding the rotor, wherein the rotor can be rotated relative to the stator and the planar layer; and forming a plurality of optical waveguides in or on the planar layer, each waveguide opening into a space surrounding the rotor, and at least one optical guiding component in or on the rotor.

Preferably, each of the stator, the rotor, and the planar layer comprise polysilicon. More preferably, the stator and the planar layer are insulated from the substrate by an oxide layer or layers.

Preferably, the optical waveguides and said optical guiding component(s) are formed in respective layers of a waveguide material deposited on the tops of the rotor and said planar layer.

Preferably, the method of the present invention comprises the steps of:

(1) oxidising the surface of a silicon substrate to form a layer of silicon oxide;

(2) depositing a layer of polysilicon on the oxide layer;

(3) etching through a region of the polysilicon, and oxidising the surface of the polysilicon;

(4) depositing a second layer of polysilicon on the exposed oxide, and selectively etching back the polysilicon to the oxide, so as to form a pillar of polysilicon;

(5) etching away the oxide surrounding the pillar, and reoxidising the exposed polysilicon surface;

(6) depositing a third layer of polysilicon, and etching or polishing the surface smooth, so that the oxide surrounding the rotor is exposed; and (7) etching away the oxide surrounding the rotor, so as to free the rotor from the stator and the surrounding polysilicon layer.

Preferably, between steps (6) and (7) a further oxide layer is formed on the surface of the device, with a fourth polysilicon layer being deposited on top of the oxide layer. The fourth polysilicon layer is then etched to form a top plate of the stator. More preferably, following this step waveguides are formed on the surfaces of the rotor and said planar layer surrounding the rotor. The step of forming waveguides may comprise depositing an oxide layer on the exposed surface, followed by a nitride layer. The nitride layer is then etched prior to depositing a further oxide layer.

BRIEF DESCRIPTION OF THE DRAWINGS

For a better understanding of the present invention and in order to show how the same may be carried into effect reference will now be made by way of example to the accompanying drawings in which:

FIGS. 4A to 4L show a series of fabrication steps for fabricating the device of FIGS. 1 and 3.

DESCRIPTION OF THE PREFERRED EMBODIMENTS

Figure 1:
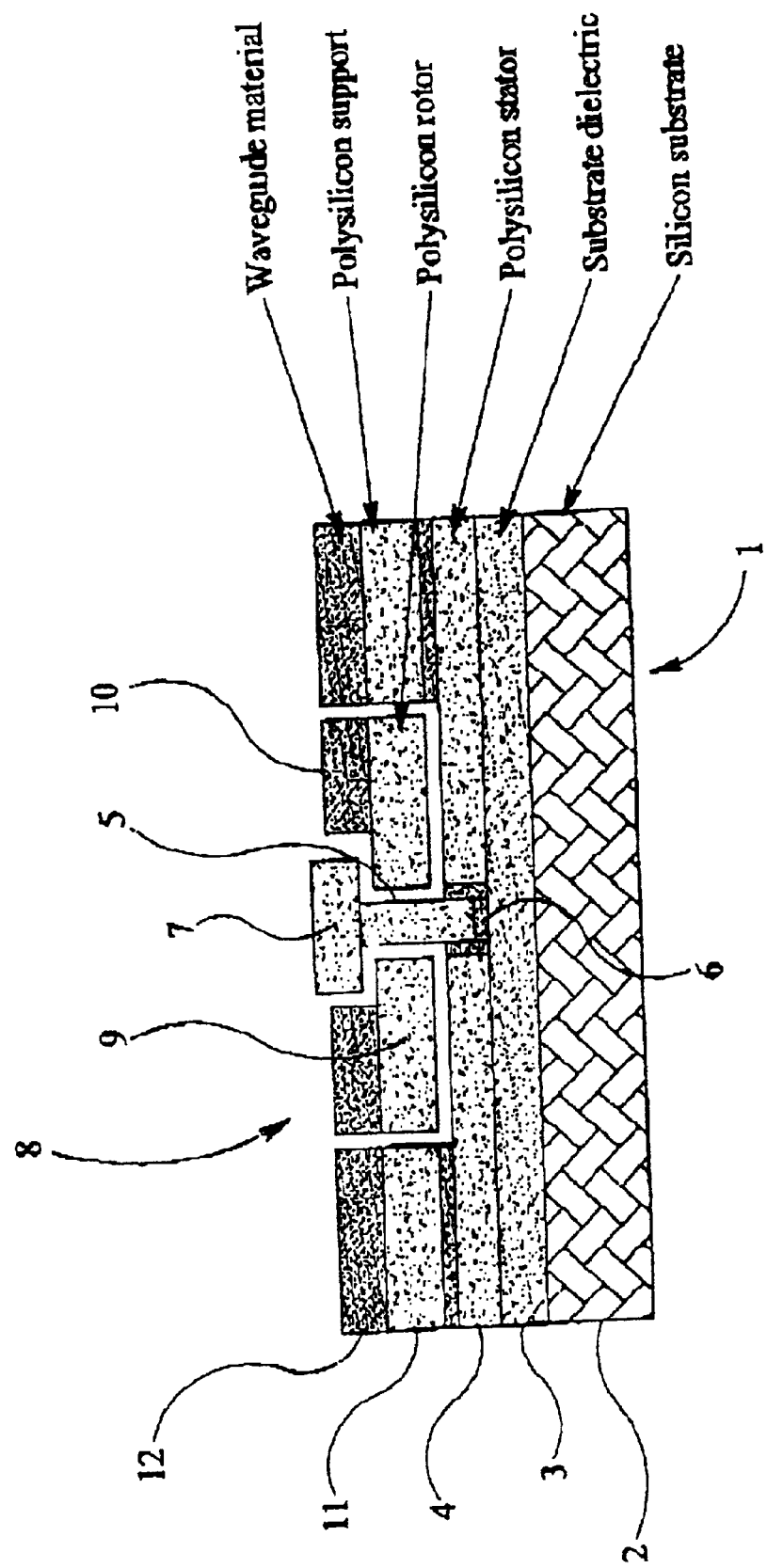
FIG. 1 shows schematically a cross-section through an optical router.

A device 1 for routing light between selected light waveguides is illustrated in FIGS. 1 and 2. The device 1 comprises a substrate 2 having an insulating layer 3 located on an upper surface thereof. A further, polysilicon layer 4 is located on top of the oxide layer 3. A cylindrical pillar 5 is embedded in the polysilicon layer 4, isolated therefrom by an oxide coating 6, and projects outwardly from the substrate to provide the stator of a motor. A circular polysilicon plate 7 tops the pillar 5.

A rotor 8 comprising a cylindrical polysilicon body 9 with a waveguide coating 10 surrounds the stator 5. The rotor 8 is located in a recess formed in a polysilicon layer 11. The polysilicon layer 11 is topped by a layer of waveguide material 12, such that the layer 12 is aligned (axially) with the layer of waveguide material 10 of the rotor 8. The rotor 8 can move about the stator 5 within the layers 11 and 12.

Figure 2A:
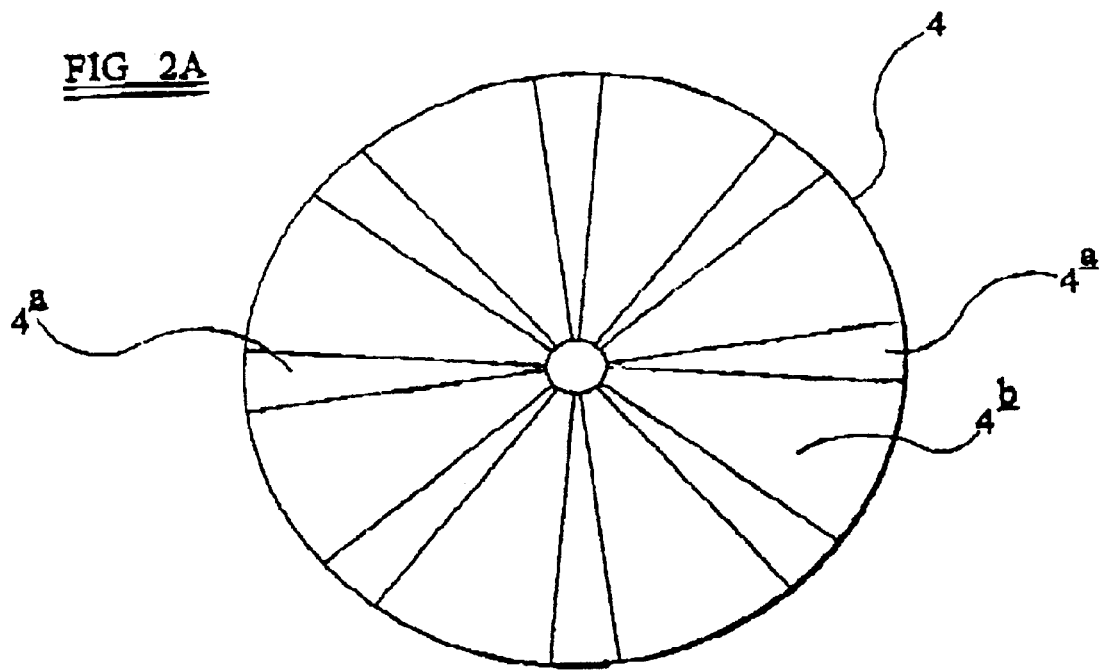
FIGS. 2A and 2B illustrate schematically a rotor and stator plate of the optical router of FIG. 1.
Figure 2B:
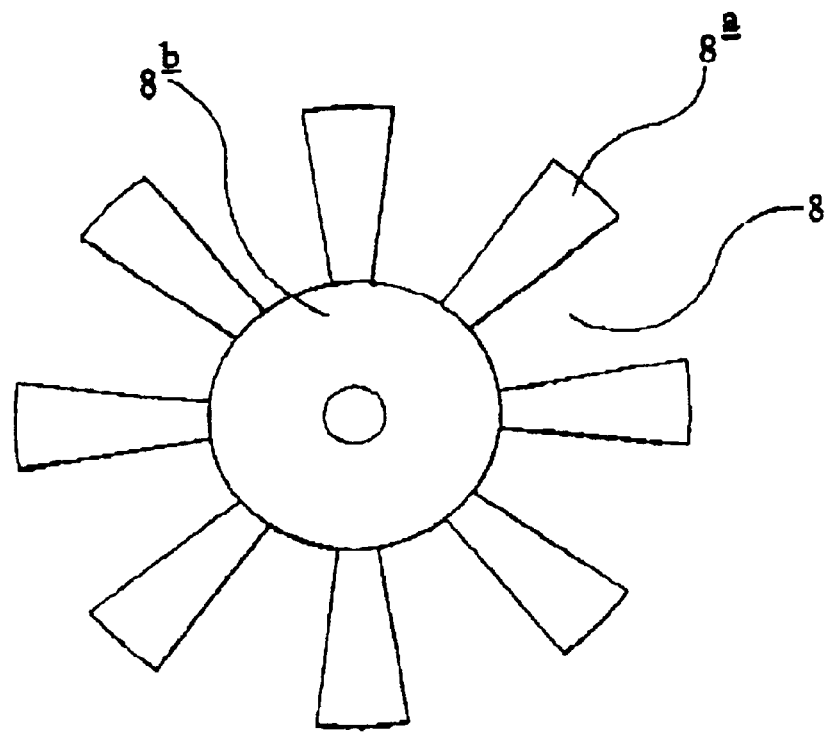

FIG. 2A illustrates in plan view the portion of the polysilicon layer 4 which underlies the rotor 8. The polysilicon is in fact a set of polysilicon plates 4a, isolated from one another by an insulating material such as silicon oxide 4b. Each plate 4a is electrically coupled to a voltage source (not shown). The layer 4 is coated with a layer of oxide in order to electrically isolate the plates 4a from the rotor 8. The rotor 8 is illustrated in plan view in FIG. 2B and also comprises a set of polysilicon plates 8a. The plates 8a are supported by a polysilicon hub 8b.

In order to rotate the stator, voltage pulses (e.g. 30V) are applied to the stator plates 4a. It will be appreciated that the plates 4a may be arranged into two or more phases in order to improve the alignment accuracy of the rotor 8. In between the application of pulses to the plates 4a, capacitance measurements may be made to ascertain the exact location of the rotor 8.

Figure 3A:
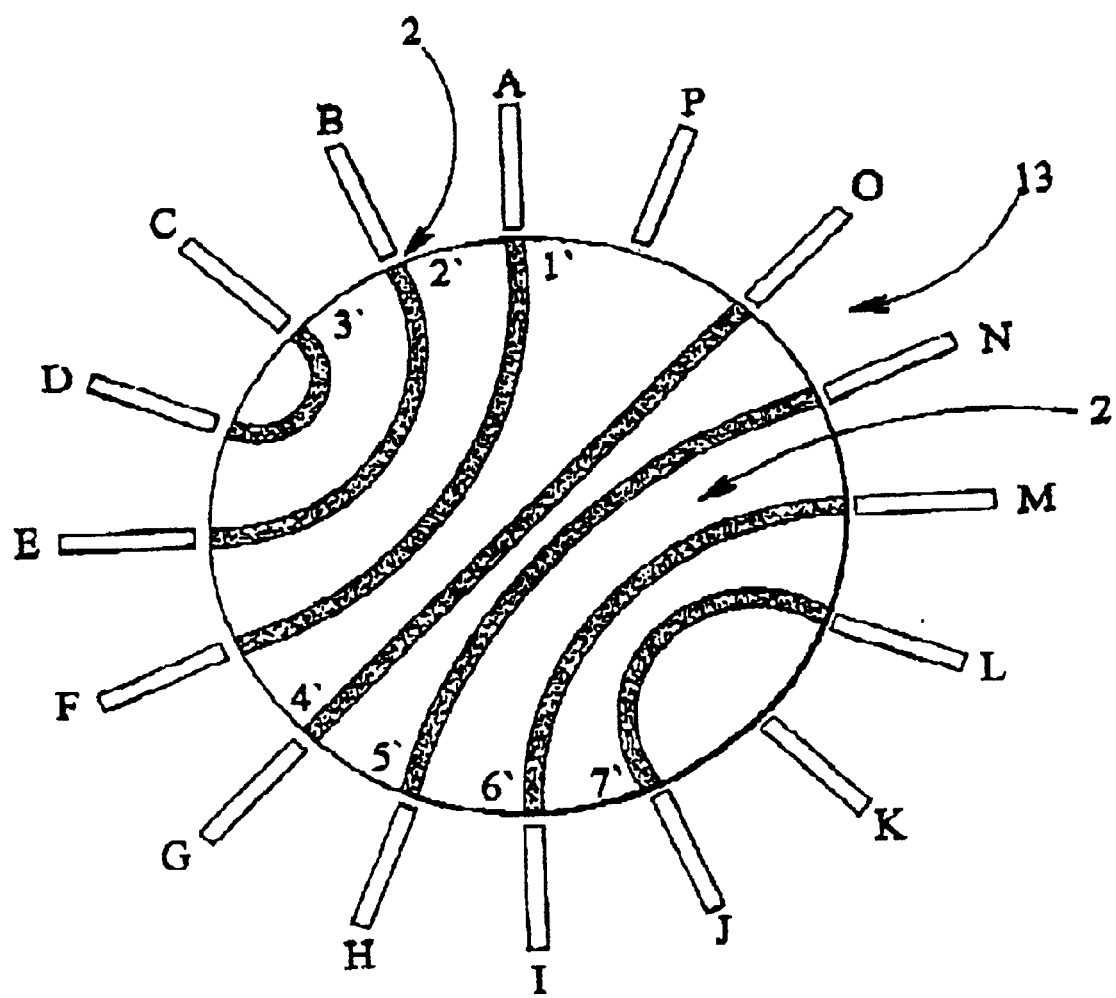
FIGS. 3A and 3B show schematically a plan view of the router of FIG. 1.

With reference to the plan view of FIG. 3A, a waveguide arrangement is shown which allows light from a single input waveguide (e.g. A) to be routed to one of a plurality of output waveguides (e.g. B to P). Both the input and output waveguides (collectively indicated by reference numeral 13) extend through the waveguide coating 12 surrounding the rotor 8. An end of each waveguide A to P terminates at the space surrounding the rotor 8. Although not shown in FIG. 3, the other ends of the waveguides may terminate at an edge of the device, where they can be coupled to optical components such as optical fibres (or, in the case of the input waveguide A, a LED or laser light source). Alternatively, the waveguides may couple light to and from on-chip optical processing components (e.g. amplifiers and further switches).

Figure 3B:
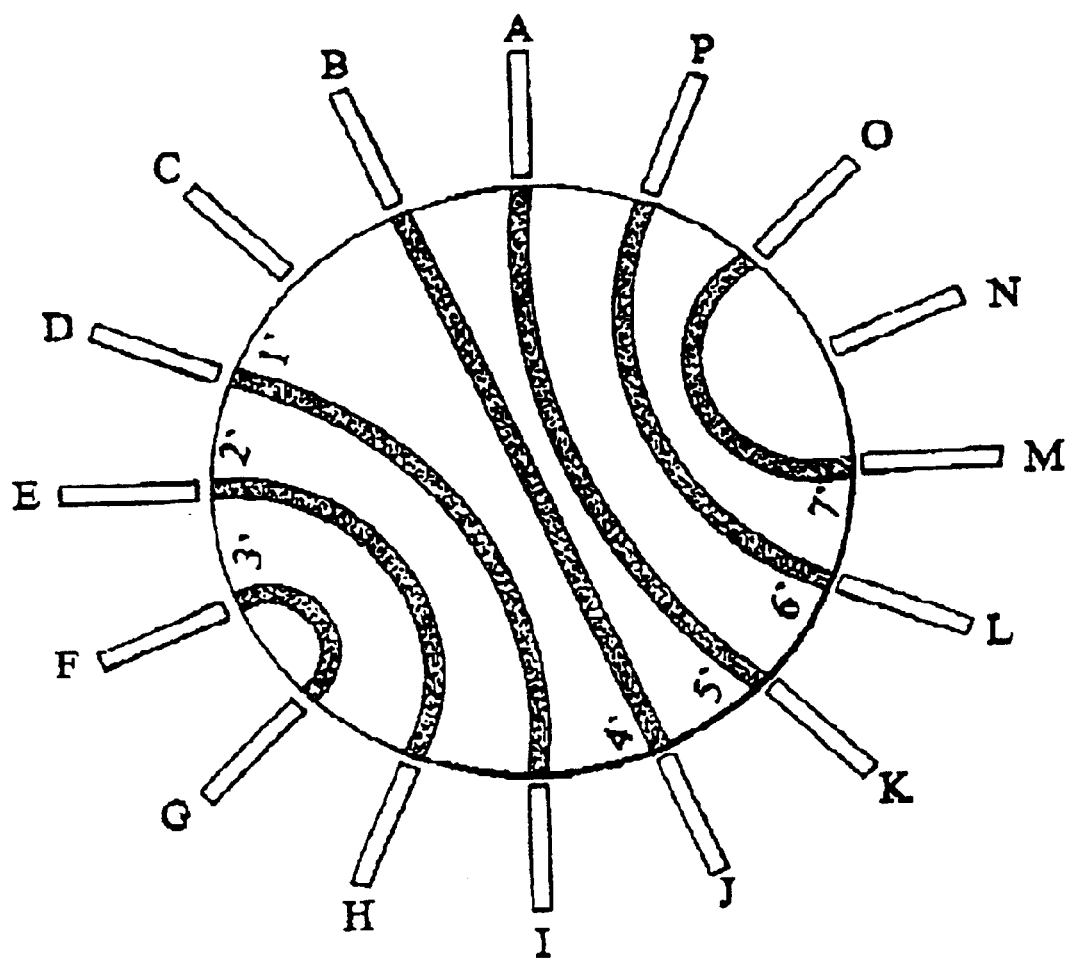

A plurality of arcuate waveguides (numbered 1' to 7') are provided in the waveguide coating 10 sitting on top of the rotor 8. The waveguides are provided in two sets, arranged on respective halves of the rotor 8, with the two ends of each waveguide terminating at the peripheral edge of the rotor 8 in the space. The waveguides are arranged such that their ends may be aligned with exposed ends of the waveguides 13 formed in the body of the device 1. It will be appreciated that the input waveguide A may be coupled to a selected one of the fifteen output waveguides (B to P) by rotating the rotor 8 to the appropriate angular position of the rotor 8. For example, FIG. 3A illustrates a first position of the rotor 8 in which the rotor waveguide 1' couples the input waveguide A to the output waveguide F, whilst FIG. 3B shows the rotor 8 in a second position in which the rotor waveguide 5' couples the input waveguide A to the output waveguide K.

Micromachining techniques are used to construct the optical switching device of FIGS. 1 to 3. Suitable techniques are described for example in "A Low-Voltage Rotary Actuator Fabricated Using a Five-Level Polysilicon Surface Micromachining Technology", Thomas W. Krygowski, Intelligent Micromachine Department, Sandia National Laboratories, Albuquerque, N. Mex. 87185-1080. Micromachining technology is a rapidly growing field where silicon processing techniques are used to form small mechanical systems.

A preferred method of fabricating the micromachined device 1 will now be described with reference to FIGS. 4A to 4L which illustrate fabrication steps 1 to 12 respectively.

Step 1 shows a silicon wafer 16 which has been oxidised. Polysilicon 17, doped heavily to enable it to conduct, is deposited on the oxide layer 18 in step 2. This layer 2 is then etched to form electrostatic plates 19 in the shape required to drive the rotor (i.e. as illustrated in FIG. 2A), and to provide a central hole for the spindle. Electrical contacts are made to the plates 19.

In step 3, an oxide layer 20 is deposited over the first polysilicon layer 17 and the spindle hole 21 is etched to the top layer of the original oxide 18. In step 4, a second polysilicon layer 22 is deposited on the structure to fill the central spindle hole 21, and is then etched in step 5 to remove polysilicon other than a central spindle pillar 23.

In step 6, the deposited oxide layer is removed. In step 7, the polysilicon layers are oxidised to form oxide layers 24, and in step 8 a third polysilicon layer 25 is deposited. The third polysilicon layer 25 is polished flat, exposing the polysilicon spindle 23 (step 9). At this point, the polysilicon layer 25 is selectively etched to form the rotor structure illustrated in FIG. 2B. In step 10, a further oxide layer 26 and a fourth polysilicon layer 27 are deposited so as to contact the exposed top of the spindle 23. This fourth polysilicon layer 27 is selectively etched (step 11) to overlay the spindle 23 in order to form a stop (which will prevent the rotor from sliding off the spindle).

Following step 10, the light waveguides are formed using materials with different optical properties, such as silicon nitride interposed by silicon dioxide, or silicon dioxide interposed between silicon nitride, or silicon nitride which is suspended on oxide or other pillars to improve optical transmission. The waveguides are formed from tracks of material which can be deposited, and printed and etched to form the pattern required, in a manner which is well known in the semiconductor industry.

A key step here is to deposit the waveguide material onto the substrate, open a central window corresponding to the rotor into which a very thin film is deposited, followed by a second deposition of waveguide material. The film is then planarised to form a surface exposing the thin film which can be etched. The waveguides are then printed to form a part on the substrate (a) and part on the rotor (b). An exemplary waveguide pattern has already been described above with reference to FIGS. 3A and 3B.

Finally the oxide layers 24, 26 surrounding the spindle 23 are etched away in order to release the rotor (at this point additional protection may be needed to prevent the oxide layer 20 underlying the spindle 23 from being etched completely). The resulting structure is shown in step 12.

It will be appreciated by the person of skill in the art that various modifications may be made to the above described embodiments without departing from the scope of the present invention.

What is claimed is:

1. An optical router comprising:
   a substantially planar substrate having an upper surface;
   a stator fixed to and projecting from said upper surface of said substrate;
   a rotor having a periphery and surrounding said stator so as to be rotatable about said stator;
   plurality of arcuate and non-intersecting optical waveguides extending across each half of said rotor in a substantially transverse plane and having ends opening onto said periphery of said rotor; and
   a substantially planar layer on said substrate surrounding said rotor and having a plurality of optical waveguides formed therein, said waveguides having openings opening at least one end onto a space surrounding said rotor,
   said stator, said rotor, and said planar layer having been formed on said substrate by a series of deposition and etching steps,
   wherein said ends of said waveguides on said rotor are alignable with said openings of said waveguides on said planar layer by rotation of said rotor about said stator.

2. A method of fabricating an optical router, said method comprising the steps of:
   depositing a first polysilicon layer on a planar substrate;
   forming a stator by etching said first polysilicon layer;
   oxidising a surface of said first polysilicon layer;
   depositing a second polysilicon layer on the oxidised surface of the first polysilicon layer;
   etching said oxidised surface of the first polysilicon layer to form a rotor surrounding said stator and a planar layer surrounding said rotor, wherein said rotor is rotatable relative to said stator and said planar layer; and
   forming a plurality of optical waveguides carried by said planar layer, each of said waveguides opening into a space surrounding said rotor, and at least one optical guiding component carried by said rotor.

3. A method according to claim 2, wherein said stator and said planar layer are insulated on said substrate by at least one oxide layer.

4. A method according to claim 2, wherein said optical waveguides and said at least one optical guiding component are formed in respective layers of a waveguide material deposited on said rotor and said planar layer.

5. A method according to claim 2, where said substrate is silicon, said method comprising the further steps of:
   (1) oxidising a surface of said silicon substrate to form a layer of silicon oxide;
   (2) depositing a first layer of polysilicon on said oxide layer;
   (3) etching through a region of said polysilicon and oxidising a surface of said polysilicon;
   (4) depositing a second layer of polysilicon on the exposed oxide, and etching back said polysilicon to said oxide around said region so as to form a pillar of polysilicon;
   (5) etching away said oxide surrounding the pillar and reoxidising the exposed polysilicon surface;
   (6) depositing a third layer of polysilicon and making the surface smooth so that the oxide surrounding said rotor is exposed; and
   (7) etching away said oxide surrounding said rotor so as to free said rotor from said stator and the surrounding polysilicon layer.

6. A method according to claim 5, further comprising the step of forming a further oxide layer on the surface of the device between said steps (6) and (7), with a fourth polysilicon layer being deposited on top of said oxide layer, and etching said fourth polysilicon layer to form a top plate of said stator.

7. A method according to claim 6, further comprising, following step (7), depositing a waveguide material on said rotor and said surrounding planar layer, and forming said waveguides and said at least one optical guiding component in said waveguide material.

* * * * *